United States Patent
Cha et al.

(10) Patent No.: US 8,418,902 B2
(45) Date of Patent: Apr. 16, 2013

(54) TELESCOPIC BICYCLE CARRIER

(75) Inventors: Dong Eun Cha, Seongnam-si (KR); Seung Mok Lee, Gunpo-si (KR); Sung Won Kim, Hwaseong-si (KR); Hun Soo Kim, Bucheon-si (KR); Hoo Taek Cho, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 200 days.

(21) Appl. No.: 12/955,764

(22) Filed: Nov. 29, 2010

(65) Prior Publication Data

US 2012/0024923 A1 Feb. 2, 2012

(30) Foreign Application Priority Data

Jul. 30, 2010 (KR) ........................ 10-2010-0074036

(51) Int. Cl.
 *B60R 9/00* (2006.01)
 *B60R 11/00* (2006.01)

(52) U.S. Cl.
 USPC ........... 224/496; 224/488; 224/489; 224/491; 224/495; 224/497; 224/502; 224/504; 224/505; 224/521

(58) Field of Classification Search ................. 224/496, 224/488, 489, 491, 495, 497, 498, 499, 502, 224/504, 505, 507, 509, 512, 514, 517, 519, 224/521, 924; 403/109.1; 248/354.1
See application file for complete search history.

(56) References Cited

U.S. PATENT DOCUMENTS

| 2,052,483 | A | * | 8/1936 | Monteith | 224/491 |
|---|---|---|---|---|---|
| 5,947,357 | A | * | 9/1999 | Surkin | 224/536 |
| 7,806,307 | B2 | * | 10/2010 | Bergerhoff et al. | 224/496 |
| 7,815,084 | B2 | * | 10/2010 | Allen et al. | 224/537 |
| 7,854,358 | B2 | * | 12/2010 | Bergerhoff et al. | 224/497 |
| 7,909,213 | B2 | * | 3/2011 | Bergerhoff et al. | 224/197 |
| 2007/0090142 | A1 | * | 4/2007 | Chuang | 224/496 |
| 2007/0102465 | A1 | * | 5/2007 | Wezyk et al. | 224/321 |
| 2010/0089957 | A1 | * | 4/2010 | Barth | 224/497 |
| 2011/0108592 | A1 | * | 5/2011 | Lee et al. | 224/488 |

* cited by examiner

*Primary Examiner* — Nathan J Newhouse
*Assistant Examiner* — Lester L Vanterpool
(74) *Attorney, Agent, or Firm* — Morgan, Lewis & Bockius LLP

(57) ABSTRACT

A telescopic bicycle carrier installed on a vehicle so as to be able to load a bicycle outside the vehicle, may include a guide rail located inside a bumper of the vehicle and fixed to an end of a body of the vehicle, a guide frame slidably installed on the guide rail along a lengthwise direction of the vehicle, a pair of expansion brackets installed on lateral sides of the guide frame and slidable toward or away from each other with respect to the guide frame in a widthwise direction of the vehicle through the guide frame, bicycle wheel fixtures pivotally installed on the pair of expansion brackets to fix wheels of the loaded bicycle, and bicycle body fixtures pivotally installed on the pair of expansion brackets to fix a body of the loaded bicycle, wherein the pair of expansion brackets may be received inside the bumper along with the guide frame in a retracted state where the expansion brackets slide toward each other into the guide frame, and may be extracted from the bumper along with the guide frame if necessary.

12 Claims, 8 Drawing Sheets

TELESCOPIC BICYCLE CARRIER

CROSS-REFERENCE TO RELATED APPLICATIONS

The present application claims priority to Korean Patent Application No. 10-210-0074036 filed on Jul. 30, 2010, the entire contents of which is incorporated herein for all purposes by this reference.

BACKGROUND OF THE INVENTION

1. Field of the Invention

The present invention relates, in general, to a telescopic bicycle carrier, which can be received inside the rear bumper of a vehicle, be extracted as needed, and be expanded in a widthwise direction of the vehicle after being extracted.

2. Description of Related Art

Today's bicycles are used for transportation as well as for leisure. In the case where the bicycles are used for leisure, their users transport the bicycles close to rivers where well-arranged roads dedicated to bicycles are provided or mountains where mountain bicycle courses are provided using a vehicle, and then use their own bicycles.

There are bicycle carriers, which are developed to be able to transport bicycles using a vehicle. Among the bicycle carriers, roof fixing type bicycle carriers installed on a roof rack of the vehicle and rear fixing type bicycle carriers installed in the rear of the vehicle are generally used. The rear fixing type bicycle carriers are mainly fixed to the trunk or tail gate of the vehicle. Recently, the rear fixing type bicycle carriers have been fixed to the tow hook of the vehicle.

However, these bicycle carriers must be separately installed on the vehicle, and thus have the following problems.

In the case of the roof fixing type bicycle carriers, it is inconvenient to raise the bicycle up to the roof of the vehicle in order to load the bicycle. When the bicycle is loaded thereon, the height and center of weight of the vehicle are increased, which unfavorably impacts the safety of the vehicle as it moves.

In the case of the rear fixing type bicycle carriers, because the bicycle is loaded on the rear of the vehicle, the problem of the roof fixing type bicycle carriers does not take place. However, when driven without the bicycle being loaded thereon, the vehicle is substantially increased in length, which gives inconvenience when operating the vehicle, since the rear fixing type bicycle carrier when installed protrudes to the rear of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a telescopic bicycle carrier, which can be received inside the rear bumper of a vehicle when a bicycle is not loaded thereon, and which can be extracted in a rearward direction of the vehicle when the bicycle is loaded thereon and to provide a telescopic bicycle carrier, which can be expanded in a widthwise direction of a vehicle when extracted in the rear of the vehicle to load a bicycle, and which can be received in the state where it may be retracted in the widthwise direction of the vehicle when received inside the rear bumper of the vehicle so as to be able to minimize the installation space.

In an aspect of the present invention, the telescopic bicycle carrier installed on a vehicle so as to be able to load a bicycle outside the vehicle, may include a guide rail located inside a bumper of the vehicle and fixed to an end of a body of the vehicle, a guide frame slidably installed on the guide rail along a lengthwise direction of the vehicle, a pair of expansion brackets installed on lateral sides of the guide frame and slidable toward or away from each other with respect to the guide frame in a widthwise direction of the vehicle through the guide frame, bicycle wheel fixtures pivotally installed on the pair of expansion brackets to fix wheels of the loaded bicycle, and bicycle body fixtures pivotally installed on the pair of expansion brackets to fix a body of the loaded bicycle, wherein the pair of expansion brackets may be received inside the bumper along with the guide frame in a retracted state where the expansion brackets slide toward each other into the guide frame, and may be extracted from the bumper along with the guide frame if necessary.

The guide frame may have an internal cavity, an upper face of which may be open such that the internal cavity may be exposed outside, and passages formed on the both lateral sides thereof such that, when the pair of expansion brackets slide toward each other, the bicycle body fixtures installed on the pair of expansion brackets may be located in the internal cavity through the passages.

The pair of expansion brackets including upper and lower expansion brackets may be configured so that bottom plates thereof may be superposed in the internal cavity of the guide frame in a vertical direction when sliding toward each other, and the upper expansion bracket located on an upper side may have an anti-interference recess to receive the bicycle body fixture, so as to prevent the upper expansion bracket from interfering with the bicycle body fixture installed on the lower expansion bracket located on a lower side.

The bicycle body fixtures each may include a base member fixed to the corresponding expansion bracket and a vertical pivoting member pivotally connected to the base member so as to selectively pivot in a vertical direction, and the vertical pivoting member may be fixed to the base member in an erect state when the bicycle may be fixed, wherein the vertical pivoting member may include a lower column pivotally connected to the base member, and a slidable upper column slidably connected to the lower column such that a length of the vertical pivoting member may be adjustable.

The bicycle wheel fixtures each may include an inner rod pivotally connected to the corresponding expansion bracket so as to selectively pivot in a horizontal direction, and a slidable outer rod slidably connected to the inner rod such that a length of each bicycle wheel fixture may be adjustable.

In another aspect of the present invention, the telescopic bicycle carrier may include a guide rail extending in a lengthwise direction of the vehicle, a guide frame slidably installed on the guide rail along the guide rail in the lengthwise direction of the vehicle, a pair of expansion brackets installed on lateral sides of the guide frame and slidable toward or away from each other with respect to the guide frame in a widthwise direction of the vehicle through the guide frame, bicycle wheel fixtures pivotally installed on the pair of expansion brackets to fix wheels of the loaded bicycle, and bicycle body fixtures pivotally installed on the pair of expansion brackets to fix a body of the loaded bicycle.

The guide frame may have an internal cavity, an upper face of which may be open such that the internal cavity may be exposed outside, and passages on the both lateral sides thereof such that, when the pair of expansion brackets slide toward each other, the bicycle body fixtures installed on the pair of expansion brackets may be located in the internal cavity through the passages.

The pair of expansion brackets including upper and lower expansion brackets may be configured so that bottom plates thereof may be superposed in the internal cavity of the guide frame in a vertical direction when sliding toward each other, and the upper expansion bracket located on an upper side may have an anti-interference recess to receive the bicycle body fixture, so as to prevent the upper expansion bracket from interfering with the bicycle body fixture installed on the lower expansion bracket located on a lower side.

The bicycle body fixtures each may include a base member fixed to the corresponding expansion bracket, and a vertical pivoting member pivotally connected to the base member so as to pivot in a vertical direction, and the vertical pivoting member may be fixed to the base member in an erect state when the bicycle may be loaded.

The vertical pivoting member may include a lower column pivotally connected to the base member, and a slidable upper column slidably connected to the lower column such that a length of the vertical pivoting member may be adjustable.

The bicycle wheel fixtures each may include an inner rod pivotally connected to the corresponding expansion bracket so as to pivot in a horizontal direction, and a slidable outer rod slidably connected to the inner rod such that a length of each bicycle wheel fixture may be adjustable.

According to the telescopic bicycle carrier described above, when the bicycle is not loaded on the telescopic bicycle carrier, the telescopic bicycle carrier is received inside the rear bumper of the vehicle, so that the length of the vehicle is not increased. Further, it is not necessary to frequently detach or attach the telescopic bicycle carrier, so that it is possible to make it more convenient.

Further, when extracted to the rear of the vehicle to be able to load the bicycle, the telescopic bicycle carrier can be expanded in the widthwise direction of the vehicle. When received inside the rear bumper of the vehicle, the telescopic bicycle carrier is constructed to be able to be received in the state where it is retracted in the widthwise direction of the vehicle, so that an installation space can be minimized.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 through 5, a telescopic bicycle carrier according to an exemplary embodiment of the present invention is configured to load a bicycle 2 outside a vehicle 1. To this end, the telescopic bicycle carrier may be installed on the vehicle during the process of manufacturing the vehicle 1 as a dependent module of the vehicle, or be separately installed on the vehicle 1 after the vehicle comes out of the factory as an independent module of the vehicle. Even if it is an independent module, once the telescopic bicycle carrier is installed on the vehicle, it is the same as if it had been installed on the vehicle during the process of manufacturing the vehicle 1. Thus, only the case where the telescopic bicycle carrier was installed on the vehicle 1 during the process of manufacturing the vehicle 1 will be described.

The telescopic bicycle carrier according to an exemplary embodiment of the present invention includes a guide rail 100, a guide frame 200, a pair of expansion brackets 300 installed on the guide frame 200, bicycle wheel fixtures 400 installed on the pair of expansion brackets 300, and bicycle body fixtures 500 installed on the pair of expansion brackets 300.

The guide rail 100 is fixed to a rear end 10 of a vehicle body so as to be located inside a rear bumper 20 of the vehicle 1, and is shaped like a hollow box, one face of which is open such that the guide frame 200 can be extracted outwards.

The guide frame 200 is installed in the guide rail 100, and slides along the guide rail 100 in a lengthwise direction L of the vehicle.

Here, the guide frame 200 sliding along the guide rail 100 employs a simple frictional sliding mode. Alternatively, the guide frame 200 may use rolling means such as a roller for smooth sliding.

Meanwhile, the guide frame 200 has an internal cavity 210 and an upper face which is open such that the cavity 210 is exposed. The guide frame 200 is provided with passages 220 in both lateral faces thereof such that, when the pair of expansion brackets 300 slide toward each other, the bicycle body fixtures 500 installed on the pair of expansion brackets 300 can be located in the cavity 210.

The pair of expansion brackets 300 are installed on left and right sides of the guide frame 200, respectively. The expansion brackets 300 slide toward or away from each other with respect to the guide frame 200 in a widthwise direction W of the vehicle. When sliding toward each other, the pair of expansion brackets 300 are configured so that their bottom plates are superposed in the cavity 210 of the guide frame 200 in a vertical direction. The upper expansion bracket 310 located on the upper side is provided with an anti-interference recess 311, which prevents the upper expansion bracket 310 from interfering with the bicycle body fixture 500 installed on the lower expansion bracket 320 located on the lower side.

Meanwhile, the upper and lower expansion brackets 310 and 320 are provided with sliding plugs 313 and 322 on first lengthwise ends thereof in a diagonal direction, respectively. Further, the upper and lower expansion brackets 310 and 320 are provided with sockets 312 and 321 on the second lengthwise ends thereof into which the sliding plugs 313 and 322 can be inserted, so that the upper expansion bracket 310 can overlap with the lower expansion bracket 320.

The bicycle wheel fixtures 400 are installed on the upper and lower expansion brackets 310 and 320 such that they can pivot in a horizontal direction H, and are installed on the upper and lower expansion brackets 310 and 320 in the same number. In the attached drawings, the case of bicycle wheel fixtures 400 installed in twos is taken by way of example.

Here, the bicycle wheel fixtures 400 installed on the upper expansion bracket 310 and the bicycle wheel fixtures 400 installed on the lower expansion bracket 320 and located opposite the bicycle wheel fixtures 400 installed on the upper expansion bracket 310 alternately fix front and rear wheels of bicycles 2 loaded as a pair.

Figure 4:
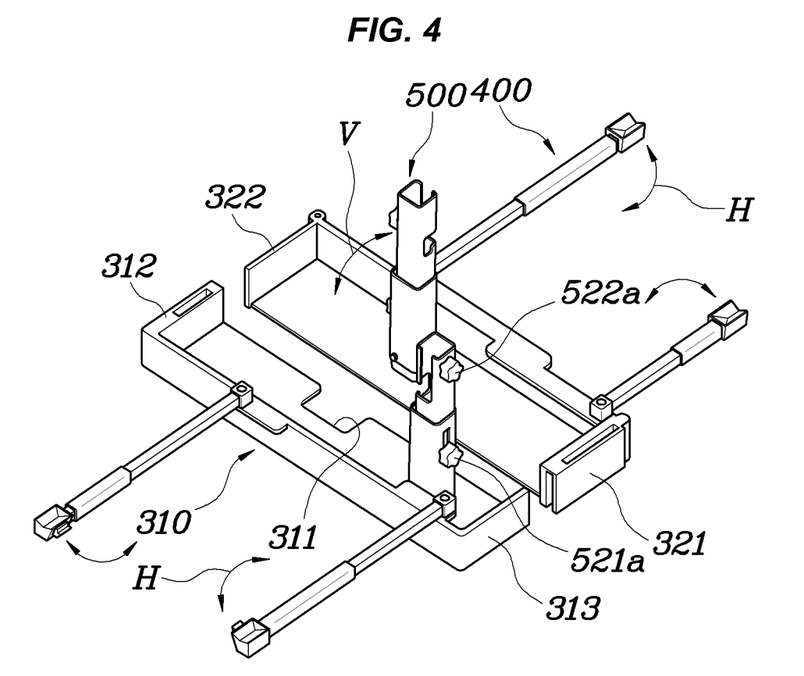
FIG. 4 illustrates expansion brackets applied to a telescopic bicycle carrier according an exemplary embodiment of the present invention, and bicycle wheel fixtures and bicycle body fixtures installed on the expansion brackets.
Figure 5:
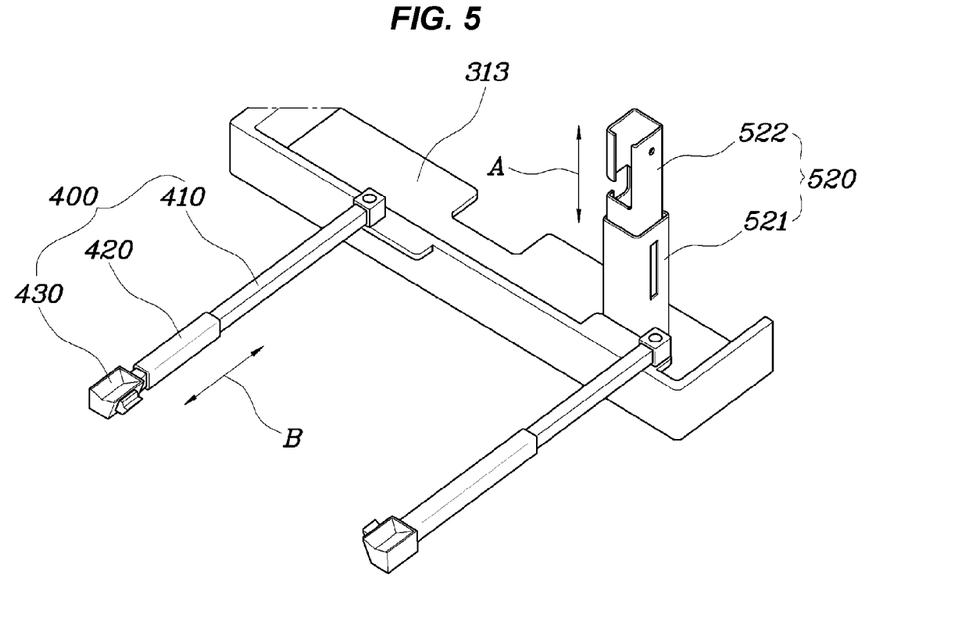
FIG. 5 illustrates how to adjust the length of a bicycle wheel fixture and how to adjust the height of a bicycle body fixture.
Figure 8:
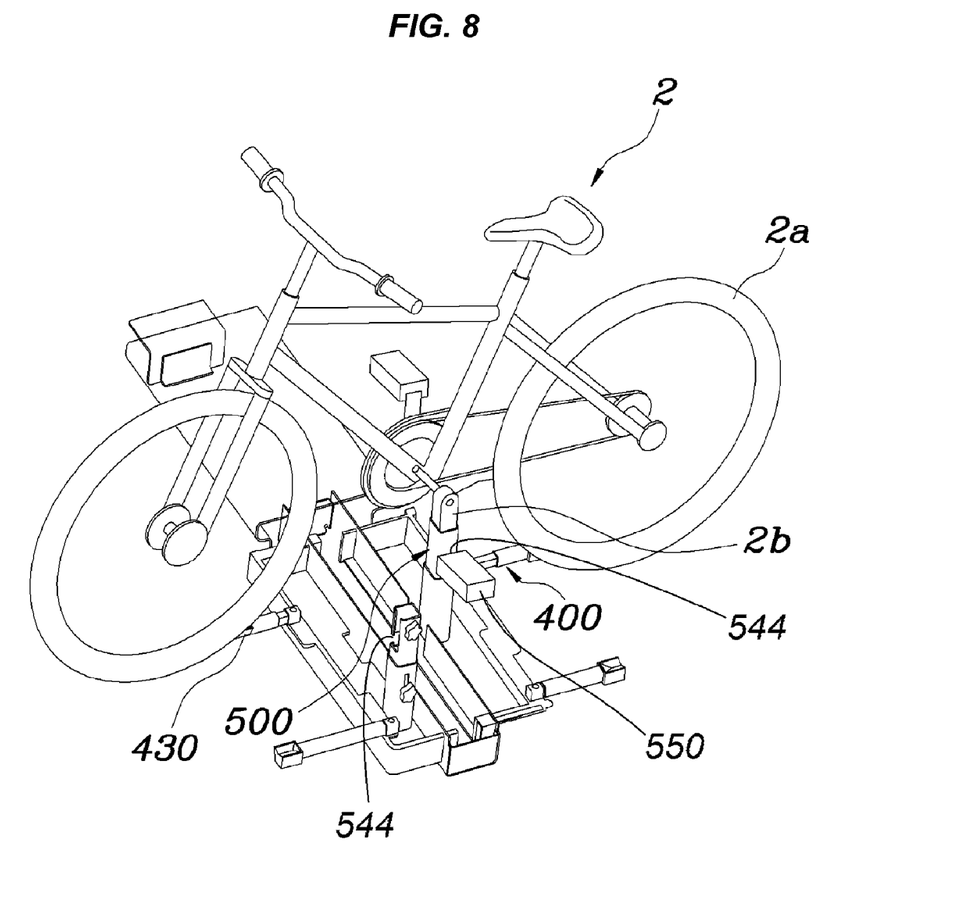
FIG. 8 illustrates the state of a bicycle fixed to bicycle wheel fixtures and bicycle body fixtures.

Meanwhile, referring to FIGS. 4, 5 and 8, each bicycle wheel fixture 400 includes an inner rod 410 connected to the corresponding expansion bracket 300 such that it can pivot in the horizontal direction H, and a slidable outer rod 420 connected to the inner rod 410 such that a length of each bicycle wheel fixture 400 can be adjusted. The outer rod 420 is provided with a wheel clamp 430 at one end thereof such that the wheel 2a of the bicycle 2 can be cradled and clamped. This wheel clamp 430 is provided with a clamping member capable of clamping the wheel 2a.

The bicycle body fixtures 500 are installed on the upper expansion bracket 310 and the lower expansion bracket 320 so as to be able to pivot in the vertical direction V, respectively. In the attached drawings, the case where the bicycle body fixtures 500 are installed on the upper expansion bracket 310 and the lower expansion bracket 320 one to one is shown by way of example.

Here, each bicycle body fixture 500 includes a base member 510 fixed to the corresponding expansion bracket 300, and a vertical pivoting member 520 connected to the base member 510 such that it can pivot in the vertical direction H. When the bicycle is loaded, the vertical pivoting member 520 is fixed in an erect state.

Meanwhile, referring to FIGS. 4, 5, 6 and 8, the vertical pivoting member 520 includes a lower column 521 connected to the base member 510, and a slidable upper column 522 connected to the lower column 521 such that a length of the vertical pivoting member 520 can be adjusted. The lower column 521 is provided with a fixing knob 521a that fixes a position of the upper column 522. The upper column 522 is provided with a link fixing knob 522a that can fix a crank 2b of the bicycle 2 which is fitted into the upper column 522. The upper column 522 includes a first hole 533 to receive the crank 2b and a second hole 544 connected to the first hole 533 to receive the pedal 550 of the bicycle as shown in FIG. 8.

Figure 6:
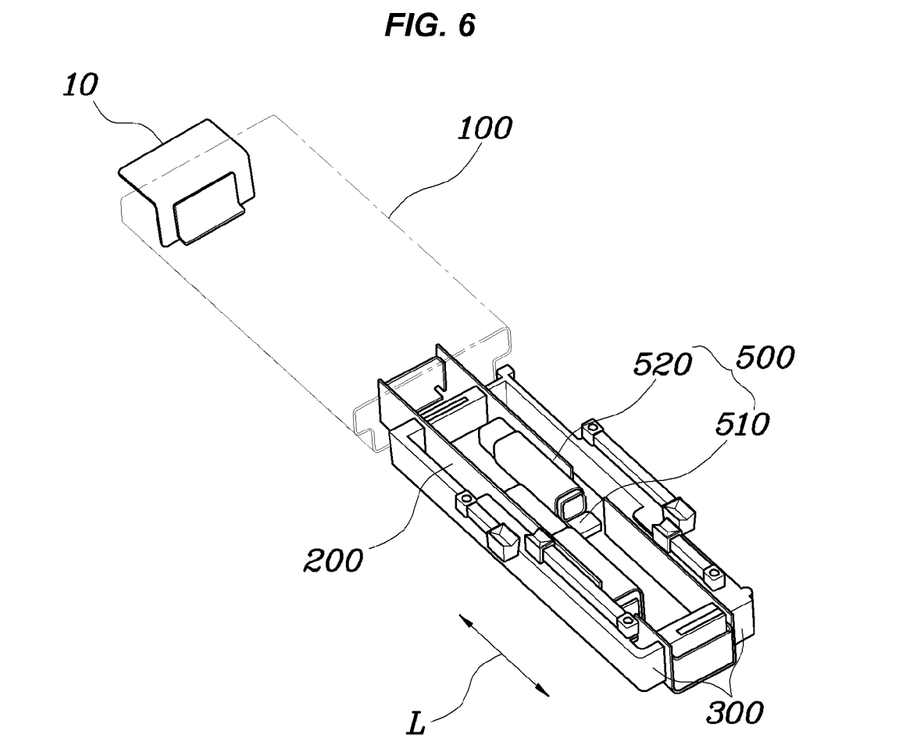
FIG. 6 illustrates the state of a pair of expansion brackets sliding toward each other.
Figure 7:
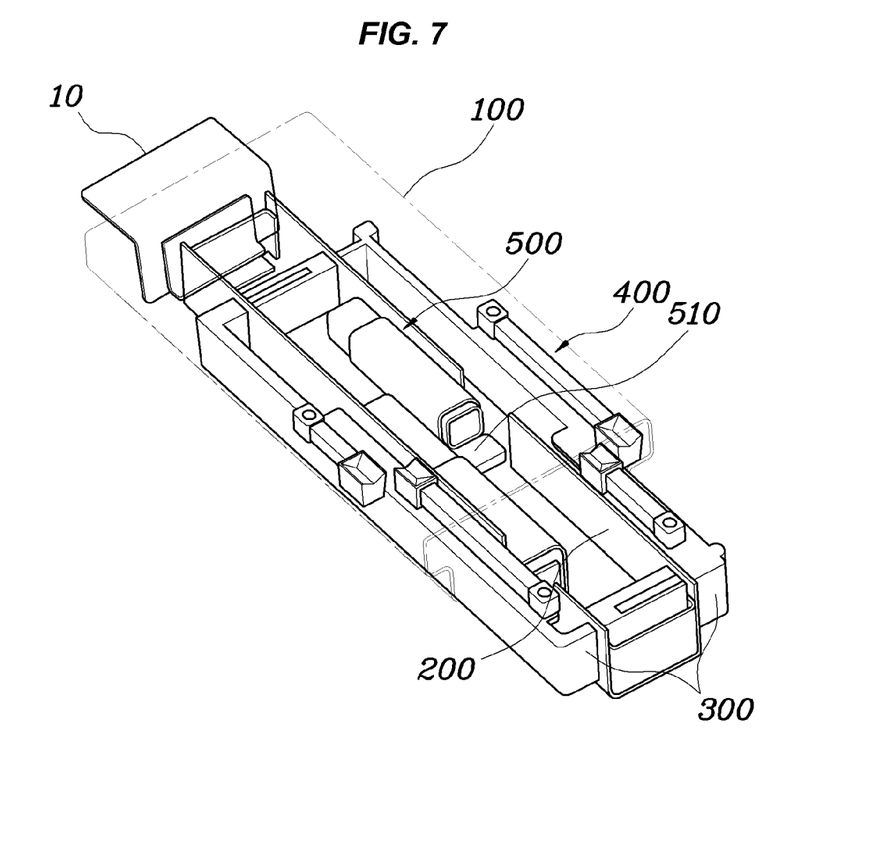
FIG. 7 illustrates the state of a guide frame slides along a guide rail in the state where a pair of expansion brackets sliding toward each other.

When the bicycle is not loaded on the telescopic bicycle carrier constructed as described above in accordance with an exemplary embodiment of the present invention, the guide frame 200, the pair of expansion brackets 300, the bicycle wheel fixtures 400, and the bicycle body fixtures 500 slide along the guide rail 100 in the lengthwise direction L of the vehicle 1 in the state where the pair of expansion brackets 300 slide toward each other, as illustrated in FIGS. 6 and 7. Here, the bicycle wheel fixtures 400 and the bicycle body fixtures 500 are pivoted and folded so as to be able to minimize the space occupied thereby.

Figure 1:
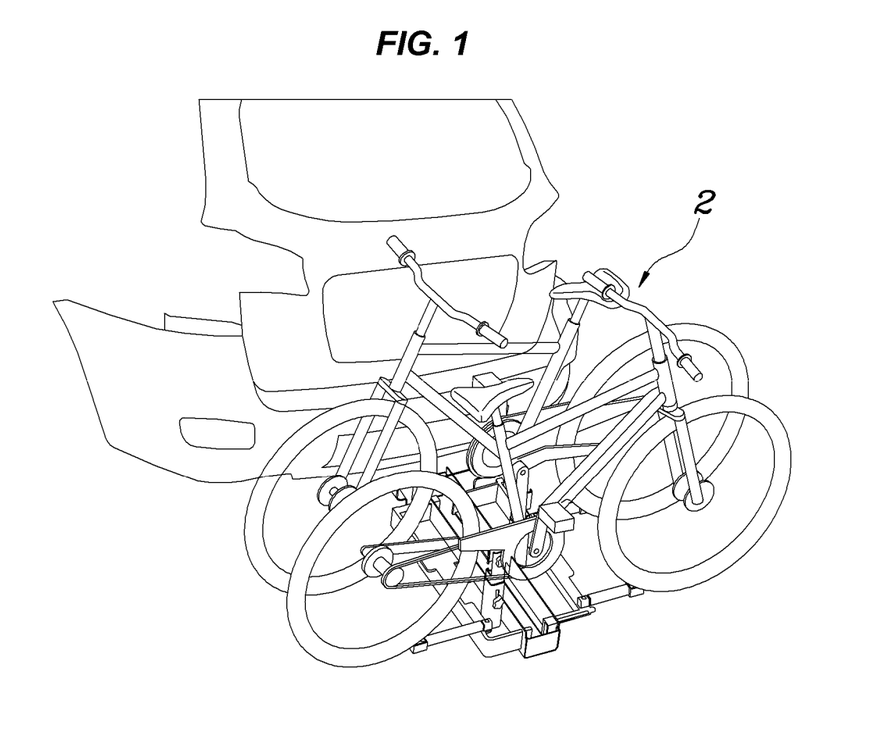
FIG. 1 illustrates the state of a bicycle loaded on a telescopic bicycle carrier being extracted from the rear bumper of a vehicle.
Figure 2:
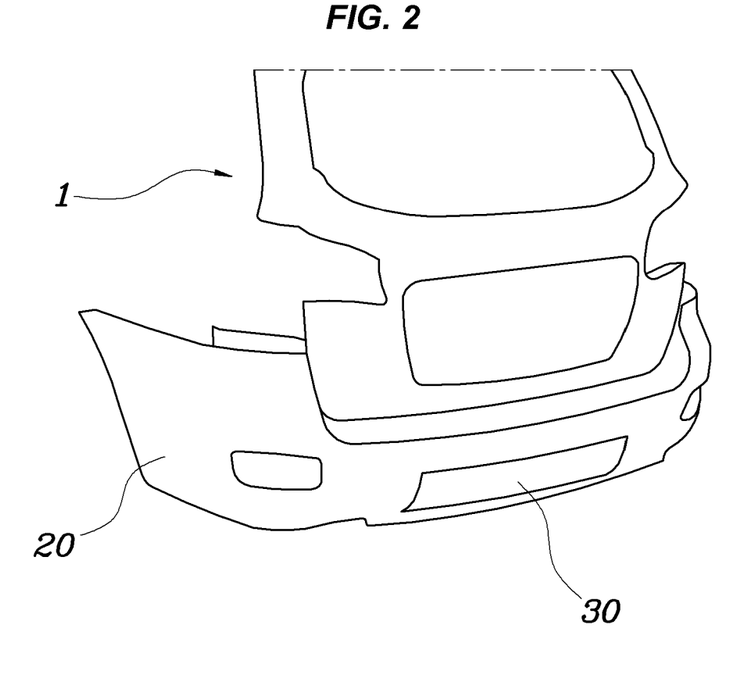
FIG. 2 illustrates the state of a telescopic bicycle carrier according an exemplary embodiment of the present invention being received inside the rear bumper of a vehicle.
Figure 3:
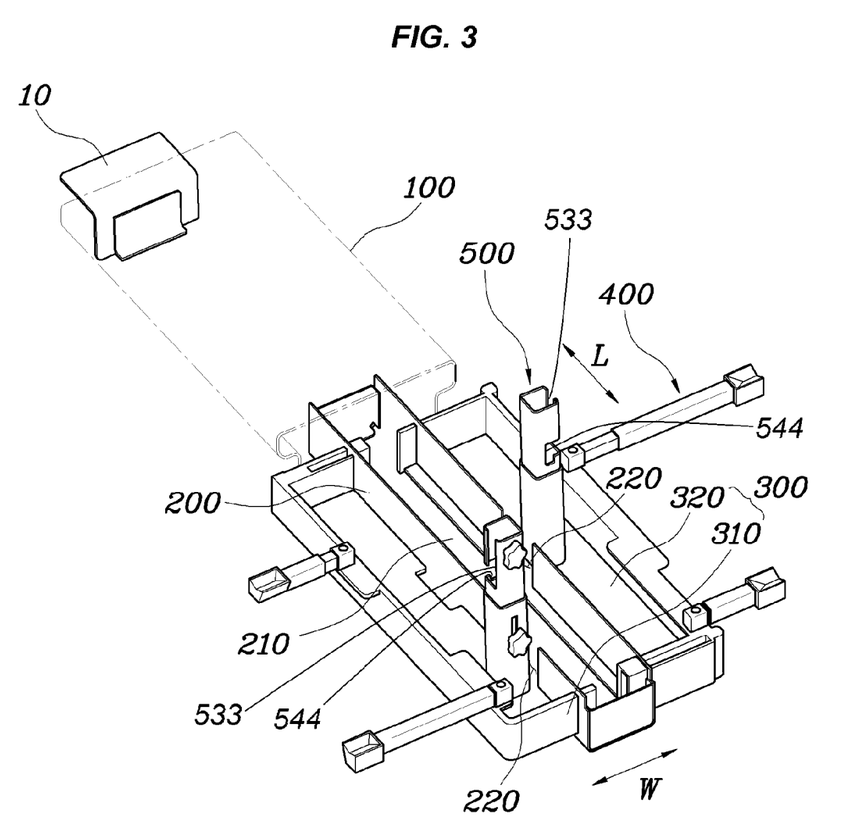
FIG. 3 illustrates the state of a telescopic bicycle carrier according an exemplary embodiment of the present invention being extracted and expanded.

As a result, when the guide frame 200, the pair of expansion brackets 300, the bicycle wheel fixtures 400, and the bicycle body fixtures 500 are inserted into the guide rail 100, all of these elements constituting the telescopic bicycle carrier can be received inside a rear bumper 20 of the vehicle 1 as illustrated in FIG. 2. When it is necessary to load the bicycle 2, the telescopic bicycle carrier can be extracted from the rear bumper 20.

Here, the guide frame 200 may be provided with an extracting bumper 30 at one end thereof which forms a part of the rear bumper 20 such that the guide frame 200, the pair of expansion brackets 300, the bicycle wheel fixtures 400, and the bicycle body fixtures 500 can be completely hidden inside the rear bumper 20 of the vehicle 1. The extracting bumper 30 is designed to be able to be separated from the rear bumper 20.

According to the telescopic bicycle carrier constructed as described above, when the bicycle is not loaded on the telescopic bicycle carrier, the telescopic bicycle carrier is received and hidden inside the rear bumper of the vehicle, and thus does not increase the length of the vehicle. Further, it is not necessary to frequently detach or attach the telescopic bicycle carrier, so that it is possible to make it more convenient.

Further, when extracted to the rear of the vehicle to load the bicycle, the telescopic bicycle carrier can expand in the widthwise direction of the vehicle. When received inside the rear bumper of the vehicle, the telescopic bicycle carrier is constructed to be able to be received in the state where it is retracted in the widthwise direction of the vehicle, so that the installation space can be minimized.

For convenience in explanation and accurate definition in the appended claims, the terms "upper", "lower", "inner" and "outer", "front" and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A telescopic bicycle carrier installed on a vehicle so as to be able to load a bicycle outside the vehicle, the telescopic bicycle carrier comprising:
 a guide rail located inside a bumper of the vehicle and fixed to an end of a body of the vehicle;
 a guide frame slidably installed on the guide rail along a lengthwise direction of the vehicle;
 a pair of expansion brackets installed on lateral sides of the guide frame and slidable toward or away from each other with respect to the guide frame in a widthwise direction of the vehicle through the guide frame;
 bicycle wheel fixtures pivotally installed on the pair of expansion brackets to fix wheels of the loaded bicycle; and
 bicycle body fixtures pivotally installed on the pair of expansion brackets to fix a body of the loaded bicycle, wherein the bicycle body fixtures include a first opening at an upper end and an axially extending opening along a side of the bicycle body fixture to receive a crank of the bicycle and a second opening extending radially from the first opening to receive a pedal of the bicycle;
 wherein the pair of expansion brackets are received inside the bumper along with the guide frame in a retracted state where the expansion brackets slide toward each other into the guide frame, and are extracted from the bumper along with the guide frame if necessary.

2. The telescopic bicycle carrier as set forth in claim 1, wherein the guide frame has an internal cavity, an upper face of which is open such that the internal cavity is exposed outside, and passages formed on the both lateral sides thereof such that, when the pair of expansion brackets slide toward each other, the bicycle body fixtures installed on the pair of expansion brackets is located in the internal cavity through the passages.

3. The telescopic bicycle carrier as set forth in claim 2, wherein the pair of expansion brackets including upper and lower expansion brackets are configured so that bottom plates thereof are superposed in the internal cavity of the guide frame in a vertical direction when sliding toward each other, and the upper expansion bracket located on an upper side has an anti-interference recess to receive the bicycle body fixture, so as to prevent the upper expansion bracket from interfering with the bicycle body fixture installed on the lower expansion bracket located on a lower side.

4. The telescopic bicycle carrier as set forth in any one of claim 1, wherein the bicycle body fixtures each include a base member fixed to the corresponding expansion bracket and a vertical pivoting member pivotally connected to the base member so as to selectively pivot in a vertical direction, and the vertical pivoting member is fixed to the base member in an erect state when the bicycle is fixed.

5. The telescopic bicycle carrier as set forth in claim 4, wherein the vertical pivoting member includes a lower column pivotally connected to the base member, and a slidable upper column slidably connected to the lower column such that a length of the vertical pivoting member is adjustable.

6. The telescopic bicycle carrier as set forth in one of claim 1, wherein the bicycle wheel fixtures each include an inner rod pivotally connected to the corresponding expansion bracket so as to selectively pivot in a horizontal direction, and a slidable outer rod slidably connected to the inner rod such that a length of each bicycle wheel fixture is adjustable.

7. A telescopic bicycle carrier comprising:
 a guide rail extending in a lengthwise direction of the vehicle;
 a guide frame slidably installed on the guide rail along the guide rail in the lengthwise direction of the vehicle;
 a pair of expansion brackets installed on lateral sides of the guide frame and slidable toward or away from each other with respect to the guide frame in a widthwise direction of the vehicle through the guide frame;
 bicycle wheel fixtures pivotally installed on the pair of expansion brackets to fix wheels of the loaded bicycle; and
 bicycle body fixtures pivotally installed on the pair of expansion brackets to fix a body of the loaded bicycle, wherein the bicycle body fixtures include a first opening at an upper end and an axially extending opening along a side of the bicycle body fixture to receive a crank of the bicycle and a second opening extending radially from the first opening to receive a pedal of the bicycle.

8. The telescopic bicycle carrier as set forth in claim 7, wherein the guide frame has an internal cavity, an upper face of which is open such that the internal cavity is exposed outside, and passages on the both lateral sides thereof such that, when the pair of expansion brackets slide toward each other, the bicycle body fixtures installed on the pair of expansion brackets is located in the internal cavity through the passages.

9. The telescopic bicycle carrier as set forth in claim 8, wherein the pair of expansion brackets including upper and lower expansion brackets are configured so that bottom plates thereof are superposed in the internal cavity of the guide frame in a vertical direction when sliding toward each other, and the upper expansion bracket located on an upper side has an anti-interference recess to receive the bicycle body fixture, so as to prevent the upper expansion bracket from interfering with the bicycle body fixture installed on the lower expansion bracket located on a lower side.

10. The telescopic bicycle carrier as set forth in one of claim 7, wherein the bicycle body fixtures each include a base member fixed to the corresponding expansion bracket, and a vertical pivoting member pivotally connected to the base member so as to pivot in a vertical direction, and the vertical pivoting member is fixed to the base member in an erect state when the bicycle is loaded.

11. The telescopic bicycle carrier as set forth in claim 10, wherein the vertical pivoting member includes a lower column pivotally connected to the base member, and a slidable upper column slidably connected to the lower column such that a length of the vertical pivoting member is adjustable.

12. The telescopic bicycle carrier as set forth in one of claim 7, wherein the bicycle wheel fixtures each include an inner rod pivotally connected to the corresponding expansion bracket so as to pivot in a horizontal direction, and a slidable outer rod slidably connected to the inner rod such that a length of each bicycle wheel fixture is adjustable.

* * * * *